(12) United States Patent
Yang et al.

(10) Patent No.: US 8,428,109 B2
(45) Date of Patent: Apr. 23, 2013

(54) ADAPTIVE ACKNOWLEDGING AND POWER CONTROL

(75) Inventors: Hong-Kui Yang, San Diego, CA (US);
Shu Wang, San Diego, CA (US); Kraig Lamar Anderson, San Diego, CA (US);
Jian Gu, Beijing (CN); Tingting Miao, Beijing (CN); Zhigang Tian, Beijing (CN)

(73) Assignee: VIA Telecom Inc., San Diego, CA (US)

( * ) Notice: Subject to any disclaimer, the term of this patent is extended or adjusted under 35 U.S.C. 154(b) by 436 days.

(21) Appl. No.: 12/691,572

(22) Filed: Jan. 21, 2010

(65) Prior Publication Data

US 2010/0202501 A1 Aug. 12, 2010

Related U.S. Application Data

(60) Provisional application No. 61/145,975, filed on Jan. 21, 2009, provisional application No. 61/145,978, filed on Jan. 21, 2009, provisional application No. 61/159,810, filed on Mar. 13, 2009.

(51) Int. Cl.
*H04B 1/38* (2006.01)

(52) U.S. Cl.
USPC .......................................................... 375/219

(58) Field of Classification Search .......... 375/148, 375/219, 259; 370/349, 401; 455/69, 522
See application file for complete search history.

(56) References Cited

U.S. PATENT DOCUMENTS

2004/0228320 A1* 11/2004 Laroia et al. .................. 370/349

* cited by examiner

*Primary Examiner* — Leon-Viet Nguyen
(74) *Attorney, Agent, or Firm* — Richard K. Huffman; James W. Huffman

(57) ABSTRACT

A communication device wirelessly coupled to another communication device. The communication device includes a first transmitter and a first receiver. The first transmitter is configured to transmit first power control bit information to the base station over a reverse link. The first transmitter has a timeline manager, configured to transmit the first power control bit information at a first rate according to a first pattern within a frame. The first receiver is configured to receive second power control bit information from the another communication device over a forward link. The first receiver has an adaptive controller, configured to determine the first rate and the first pattern. The first rate and the first pattern are selected from a plurality of rates and patterns available for transmission of the first power control bit information and the second power control bit information.

15 Claims, 9 Drawing Sheets

SYSTEM FOR ADAPTIVE WIRELESS POWER CONTROL

WIRELESS POWER CONTROL EXAMPLE

REVERSE LINK POWER CONTROL - BASE STATION TO MOBILE STATION

FORWARD LINK POWER CONTROL - MOBILE STATION TO BASE STATION

SYSTEM FOR ADAPTIVE WIRELESS POWER CONTROL

DYNAMIC WIRELESS POWER CONTROL

EARLY ACK-BASED WIRELESS POWER CONTROL

AN EXAMPLE OF POWER CONTROL TIMELINE AND PCB POSITIONS

AN EXAMPLE OF POWER CONTROL TIMELINE AND PCB POSITIONS

AN EXAMPLE OF POWER CONTROL TIMELINE AND PCB POSITIONS

AN EXAMPLE OF POWER CONTROL TIMELINE AND PCB POSITIONS

ADAPTIVE ACKNOWLEDGING AND POWER CONTROL

CROSS-REFERENCE TO RELATED APPLICATIONS

This application claims the benefit of the following U.S. Provisional Applications, each of which is herein incorporated by reference for all intents and purposes.

| SERIAL NUMBER | FILING DATE | TITLE |
| --- | --- | --- |
| 61/145,975 (VTU.09-0016-US) | Jan. 21, 2009 | ADAPTIVE POWER CONTROL |
| 61/145,978 (VTU.09-0017-US) | Jan. 21, 2009 | ADAPTIVE RL POWER CONTROL FOR CDMA2000 1X REV. E |
| 61/159,810 (VTU.09-0025-US) | Jan. 21, 2009 | ADAPTIVE ACKNOWLEDGING AND POWER CONTROL |

BACKGROUND OF THE INVENTION

1. Field of the Invention

This invention relates in general to the field of microelectronics, and more particularly to an apparatus and method for reducing interference in a wireless communication system.

2. Description of the Related Art

The cell phone industry is undergoing exponential growth, not only in the this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems prevalently employed frequency division multiple access (FDMA) as the modulation strategy. One well known example of this technology is Global System for Mobile Communications (GSM), in which a particular cell phone communicates with its base station within a given cell over a specific frequency channel. In order for that cell phone to communicate with a base station in an adjacent cell, it must be assigned a new frequency channel and the switch coordinated in time with the old base station, the new base station, and the cell phone itself. This type of handoff from one cell to the next is known as a hard handoff.

Currently, so-called "3G" or third generation cellular communications technologies are being developed. These technologies are not characterized so much by modulation techniques, but more so by performance metrics (e.g., 2 Megabits per second indoor data rates, 384 Kilobits per second outdoor data rates). As such, there are presently a number of diverse approaches being proposed for 3G.

In the interim, a number of hybrid technologies are being provided, known as "2.5G" techniques and protocols, one of which is CDMA2000, which is also known as IS-95. This system utilizes spread spectrum code division multiple access (CDMA) techniques to multiplex many users over a single frequency channel thus providing capacity improvements over that which can be attained through the use of current FDMA systems. Under CDMA, the same frequency channel is used to communicate with all of the mobile stations within a group of adjacent cells and signals to and from the mobile stations are uniquely encoded using orthogonal codes.

Since the same frequency channel is used to communicate with multiple cell phones, the preclusion and reduction of interference is highly desirable, and numerous techniques and methods are extant within the art to enable adjacent mobile stations to communicate with their base station controllers without causing undue interference. One such technique is called closed loop power control.

Under this technique, information is regularly and frequently exchanged between a base station and a mobile station about the power level that is being received and requests are made to either increase or decrease that power level in order to maximize signal to noise ratio for those signals relative to other signals that are being received. In a present day scenario, these messages are exchanged roughly every five milliseconds.

But there are also several other techniques that is employed in a present day CDMA-based wireless communication system to reduce interference such as smart blanking and early message termination, which do not entirely comport with the protocol that is defined by IS-95 for the exchange of power control information. For example, there is only one timeline that is defined by IS-95 for the exchange of power control information between a mobile station and a base station, and often times it has been observed that this timeline is restrictive in the presence of smart blanking. That is, when smart blanking is enabled, the latency for implementing power control measures essentially doubles. What this means is that it takes longer for, say, a base station to request a transmit power level adjustment in a corresponding mobile station. And vice versa.

The present inventors have also observed under other circumstances, say early termination where a mobile station has acknowledged reception of a message in mid-frame and the base station has terminated transmission of traffic early, the protocol dictates that power control information still be sent as the same frequency for the remainder of the frame.

Therefore, what is needed is an apparatus and method whereby power control timelines between a base station and a mobile station can be adaptively modified to provide for reduction in the latencies associated with affective power control.

In addition, what is needed is a mechanism in both mobile stations and base stations that enables an optimum power control timeline to be selected from among several timelines in order to reduce latencies or to optimize other system parameters.

Furthermore, what is needed is a technique for increasing and decreasing the transmission of power control information between a base station and a mobile station under so-called smart blanking scenarios.

Moreover, what is needed is a method for dynamically reducing the rate of power control information by a base station when the base station stops transmitting traffic due to early acknowledgement by a receiving mobile station.

SUMMARY OF THE INVENTION

The present invention, among other applications, is directed to solving the above-noted problems and addresses other problems, disadvantages, and limitations of the prior art. The present invention provides a superior technique for performing power control in a CDMA-based telecommunications system.

One aspect of the present invention comprehends a communication device wirelessly coupled to another communication device, comprising a receiver, a PCB manager and a transmitter. The receiver configured to receive a plurality of sub-frames and to generate a pattern signal; The PCB processor configured to receive a plurality of first power control bits which is selected from the plurality of received sub-frames and generate a power level indicating signal; The PCB manager, configure to receive the pattern signal and determine the validation and place of a plurality of second power control bits according to the pattern signal; and the transmitter, configured to transmit the plurality of second power control bits to the another communication device according to the power level indication signal.

Another aspect of the present invention contemplates a method for a communication device which is wirelessly coupled to another communication device, the method comprising: receiving a plurality of sub-frames, wherein the plurality of sub-frames further comprising a plurality of first power control bits; generating a pattern signal and a power level indicating signal; determining the validation and place of a plurality of second power control bits according to the pattern signal; and transmitting the plurality of second power control bits to the another communication device according to the power level indication signal.

A further aspect of the present invention contemplates a system, the system comprising a first communication device and a second communication device. The first communication device wirelessly coupled to a second communication device, the first communication device further comprising a first receiver, a first PCB processor, a first PCB manager and a first transmitter. The first receiver, configured to receive a plurality of first sub-frames, generate a first pattern signal; The first PCB processor, configured to receive a plurality of first power control bits which is selected from the plurality of received first sub-frames and generate a first power level indicating signal; The first PCB manager, configure to receive the first pattern signal and determine the validation and place of a plurality of second power control bits according to the first pattern signal; and the a first transmitter, configured to transmit the plurality of second power control bits by a plurality of second sub-frames according to the first power level indication signal. The second communication device, further comprising a second receiver, a second PCB processor, a second PCB manager and a second transmitter. The second receiver, configured to receive the plurality of second sub-frames, generate a second pattern signal; The second PCB processor configured to receive the plurality of second power control bits which is selected from the plurality of received second sub-frames and generate a second power level indicating signal; The second PCB manager, configure to receive the second pattern signal and determine the validation and place of the plurality of first power control bits according to the second pattern signal; and the second transmitter, configured to transmit the plurality of first power control bits to the mobile apparatus by the plurality of first sub-frames according to the second power level indication signal.

Regarding industrial applicability, the present invention may be implemented within one or more integrated circuits within a cellular communications device, such as a mobile station (i.e., cell phone) or base station.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on CDMA-based telecommunications and associated techniques employed within wireless communication systems for reducing interference by controlling transmitted power, a discussion of the problems inherent in the present day approach will now be presented with reference to FIGS. 1-4. Following this discussion, a detailed disclosure of the present invention will be presented with reference to FIGS. 5-8. The present invention overcomes the limitations of existing power control mechanisms by providing techniques that allow for significant improvements in interference reduction, thereby enabling an increase in the capacity of a system.

Figure 1:
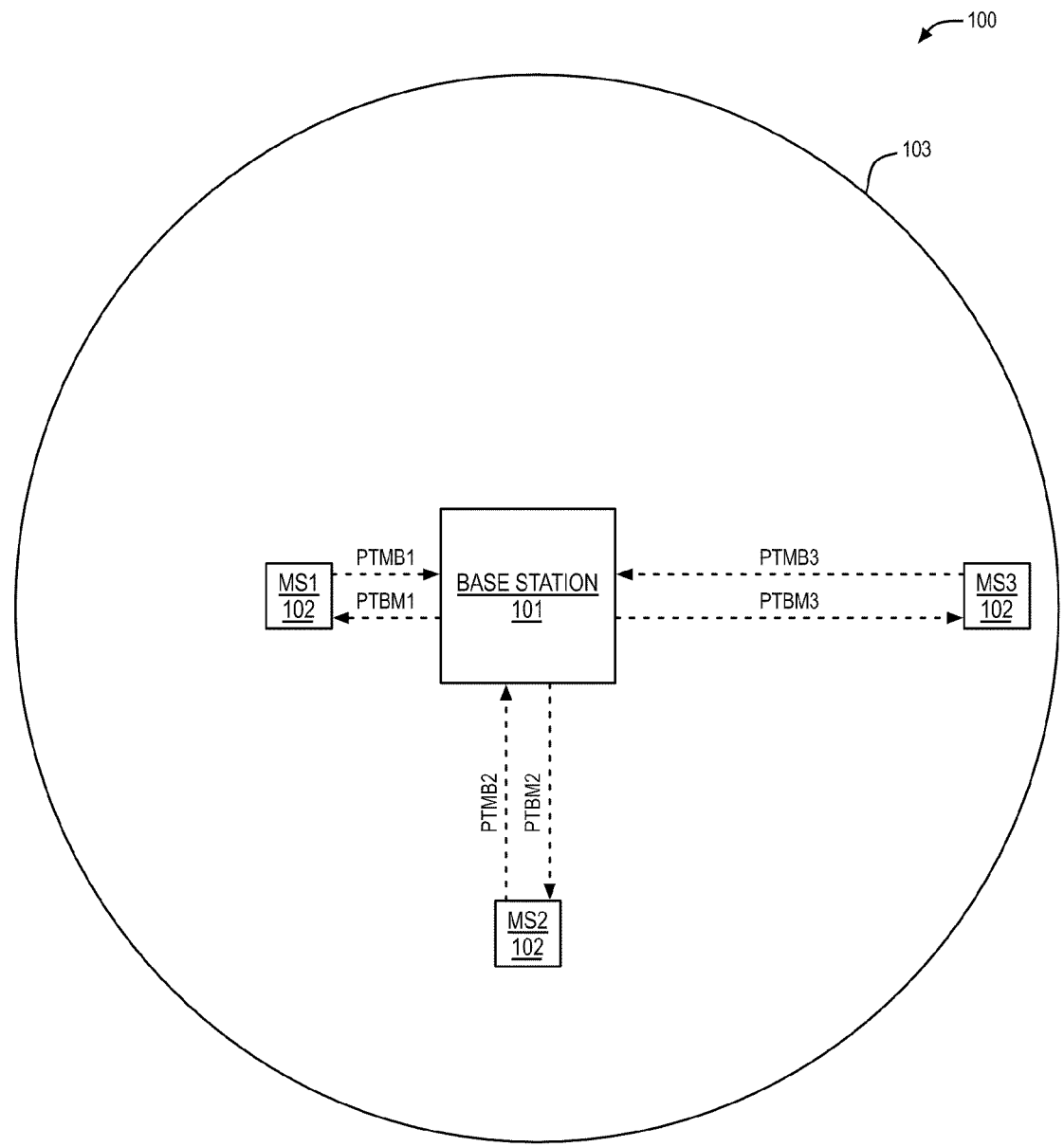
FIG. 1 is a block diagram illustrating a prior art power control example within a wireless communication system.

Referring now to FIG. 1, a block diagram 100 is presented illustrating a prior art power control example within a wireless communication system. The diagram 100 depicts a wireless base station 101 that is actively communicating with three mobile stations 102, MS1 102, MS2 102, and MS3 102, within a wireless coverage area 103 (or, "cell" 103). As one skilled in the art will appreciate, all of the mobile stations 102 within the cell 103 communicate with the base station 101 by a direct sequence spread spectrum technique where different codes (i.e., PN codes) are employed to distinguish communication signals that are transmitted over the same frequency channel. Consequently, it is essential that transmit power from the base station 101 and the mobile stations 102 be actively controlled in order to preclude interference. That is, if one mobile station 102 were to transmit at maximum power, a consequence of doing so would be that the transmission from that mobile station 102 would appear as significant interference to the other mobile stations 102 and to the base station 101. In particular, it is the interference as seen by the base station 101 that is most often problematic. As the diagram 100 depicts, MS1 102 is closest to the base station 101 and transmits a signal on the reverse link at power level PTMB1. The base station 101 transmits a signal to MS1 102 on the forward link at power level PTBM1. Device MS2 102 is intermediate in distance to the base station 101 and transmits a signal on the reverse link at power level PTMB2. The base station 101 transmits a signal to MS2 102 on the forward link at power level PTBM2. Finally, device MS3 102 is farthest in distance from the base station 101 and transmits a signal on the reverse link at power level PTMB3. The base station 101 transmits a signal to MS3 102 on the forward link at power level PTBM3.

In that received power by any of the mobile stations 102 or the base station 101 is proportional to the square of the separation between a transmitter and receiver, it become clear that if device MS1 102 were transmitting at maximum power level, the signals transmitted on the reverse link by devices MS2 102 and MS3 102 would be effectively lost in the noise as seen by the base station 101.

Consequently, the use of so-called closed loop power control techniques have consistently been emphasized through revisions of numerous CDMA-based communication protocols, and in particular in the well known IS-95 (also referred to as CDMA2000) protocol. In earlier versions of the protocol, power control feedback or messages were exchanged once per 20 millisecond (ms) frame, and more recently the maximum frequency of power control messages has been increased.

Figure 2:
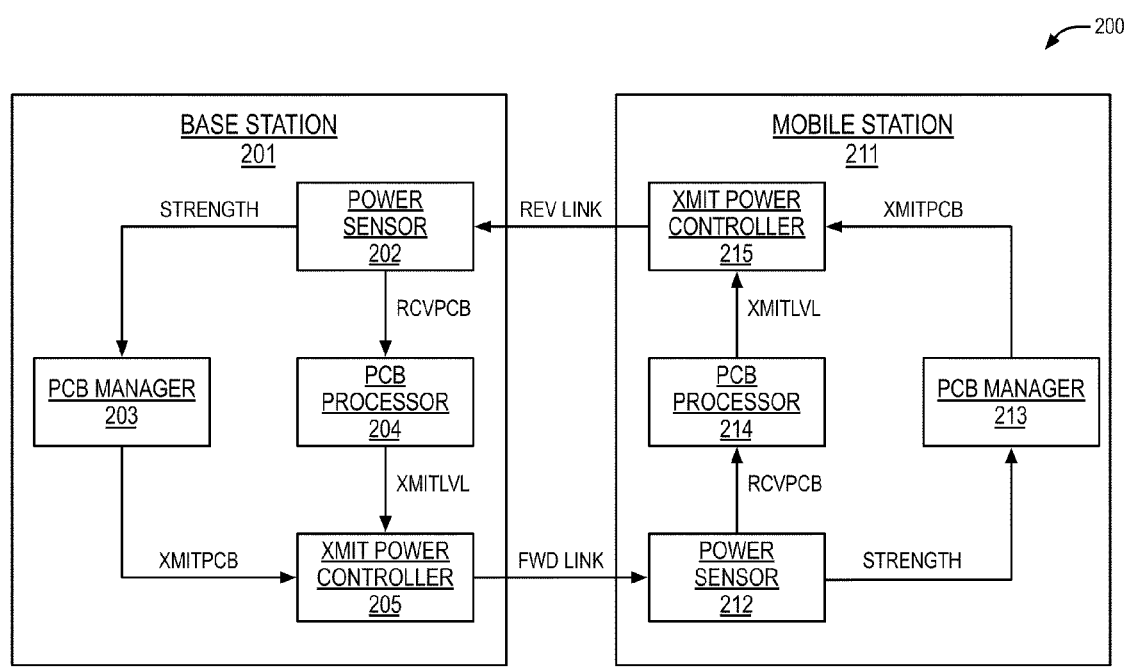
FIG. 2 is a block diagram depicting a prior art wireless communication system that provides for interference reduction by performing power control.

Turning now to FIG. 2, a block diagram is presented depicting a prior art wireless communication system 200 that provides for interference reduction by performing power control. The system 200 includes a base station 201 and a mobile station 211. The base station 201 is coupled to the mobile station 211 by a wireless forward link, upon which traffic and control data are sent by the base station 201 to the mobile station 211, including power control data. The base station 201 is also coupled to the mobile station 211 by a wireless reverse link, upon which traffic and control data are sent by the mobile station 211 to the base station 201, including power control data.

The base station 201 has a power sensor 202 that is coupled to the reverse link, and which generates a strength signal STRENGTH and a received power control bits signal RCVPCB. Signal STRENGTH is coupled to a power control bit manager 203, which generates a transmit power control bit signal XMITPCB. Signal RCVPCB is coupled to a power control bit processor 204, which produces a transmit level signal XMITLVL. Signals XMITPCB and XMITLVL are coupled to a transmit power controller 205. The transmit power controller 205 is coupled to the forward link, which is employed to send traffic and power control messages to the mobile station 211.

The mobile station 211 has a power sensor 212 that is coupled to the forward link, and which generates a strength signal STRENGTH and a received power control bits signal RCVPCB. Signal STRENGTH is coupled to a power control bit manager 213, which generates a transmit power control bit signal XMITPCB. Signal RCVPCB is coupled to a power control bit processor 214, which produces a transmitting level signal XMITLVL. Signals XMITPCB and XMITLVL are coupled to a transmit power controller 215. The transmit power controller 215 is coupled to the reverse link, which is employed to send traffic and power control messages to the base station 201.

In operation, closed loop power control is affected through the timely exchange of power control messages between the base station 201 and the mobile station 211. Like-named elements within both the base station 201 and mobile station 211 perform substantially similar functions to achieve substantially similar results from the perspective of closed loop power control. That is, the power sensors 202, 212 monitor respective reverse and forward link messages to receive power control bits within frames received and also to measure the relative power level of the received signals on the links. The base station power sensor 202 generates STRENGTH to indicate the measured power level of the reverse link signal and also generates RCVPCB to indicate power control bit data that has been received from the mobile station 211. The power control bit data directs that the level of the forward link signal be either increased or decreased according to the protocol. Likewise, the mobile station power sensor 212 generates STRENGTH to indicate the measured power level of the forward link signal and also generates RCVPCB to indicate power control bit data that has been received from the base station 201. The power control bit data directs that the level of the reverse link signal be either increased or decreased according to the protocol.

The PCB processors 204, 214 receive and interpret the RCVPCB signals and generate XMITLVL signals that direct their respective transmit power controllers 205, 215 to increase or decrease transmit power in accordance with the power control bit data which was received.

The PCB managers 203, 213 receive their respective STRENGTH signals and determine whether to request a change in power level transmitted by the counterpart station 211, 201. Accordingly, the PCB managers 203, 213 configure power control bit data for transmission within a frame (or, "packet") to the counterpart station 211, 201 that directs that counterpart station 211, 201 to increase or decrease transmitted power.

The transmit power controllers 205, 215, transmit their respective power control bit data, as directed by signals XMITPCB over the forward and reverse links at the power levels indicated by signals XMITLVL, thus achieving what is known by those in the art as closed loop power control.

Figure 3:
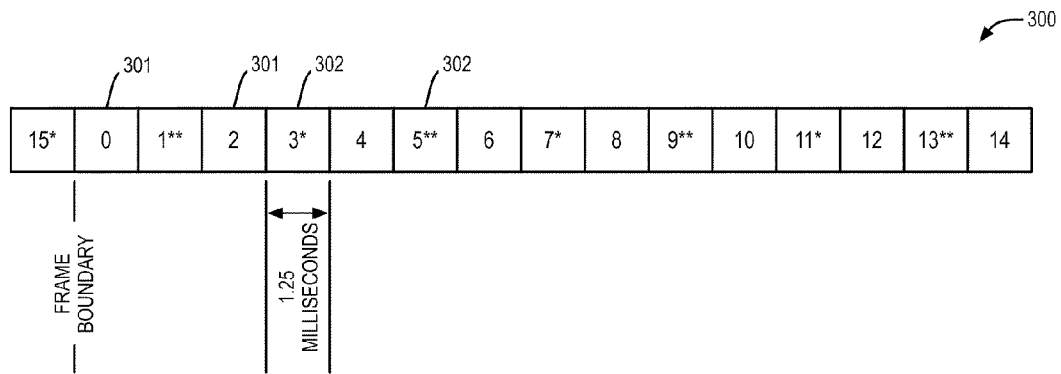
FIG. 3 is a block diagram showing power control features within power control group frames transmitted by the base station of FIG. 2.

Now referring to FIG. 3, a block diagram 300 is presented showing power control features within power control group frames transmitted by the base station 201 of FIG. 2 over the forward link to achieve power control of the reverse link.

According to the IS-95 CDMA protocol, a frame is 20 ms in duration and is broken into 1.25 ms sub-frames 301, 302, which are known as power control groups (PCGs) 301, 302 because they can each be configured to convey power control bits therein directing the mobile station to increase or decrease its subsequent transmitted power. The 16 PCGs 301, 302 within a given frame are numbered from 0 to 15. Thus, the diagram 300 shows PCG15 from a previous frame, which is followed by PCG0 through PCG14 from a current frame. When the significatory bit in PCG 15 is set to '0' for example, it means the next frame is a null-rate frame with smart-blanking (it is easy to understand the other value may conduct the same function). According to current IS-95 protocol, power control bits may be sent during a non-null-rate frame during those PCGs which are denoted by one or two following asterisks (i.e., "*" or "**"). Accordingly, power control bits are sent on the forward link during odd-numbered PCGs 302, thus affecting a power control rate of 400 Hertz (Hz). No power control bits are sent on the forward link during even numbered frames 301.

Figure 4:
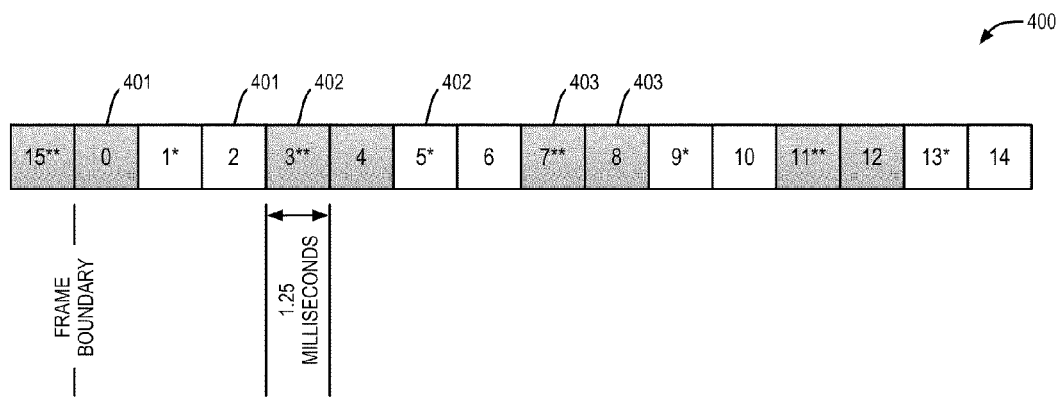
FIG. 4 is a block diagram showing power control features within power control group frames transmitted by the mobile station of FIG. 2.

FIG. 4 is a block diagram 400 showing power control features within power control group frames transmitted by the mobile station of FIG. 2 over the reverse link to achieve power control of the forward link. Like the PCGs 301, 302 of FIG. 3, the frames transmitted by the mobile station to the base station include PCGs 401, 402, 403, some of which can each be configured to convey power control bits therein directing the base station to increase or decrease its subsequent transmitted power. Thus, the diagram 400 shows PCG15 from a previous frame, which is followed by PCG0 through PCG14 from a current frame. According to current IS-95 protocol, power control bits may be sent during a non-null-rate frame during those PCGs which are denoted by one or two following asterisks (i.e, "*" or "**"). Accordingly, power control bits are sent on the reverse link during odd-numbered PCGs 402, thus affecting a power control rate of 400 Hertz (Hz). No power control bits are sent on the reverse link during even numbered frames 401.

There is a newer feature of the IS-95 protocol known as smart blanking, where a comporting mobile station transmits to its base station a null-rate frame. It is beyond the scope of this application to provide an in-depth tutorial of smart blanking, however, it is sufficient to note that a null-rate frame is conveys no traffic information to the base station other than an indication that background noise is essentially at the same level as communicated by a previous frame. As one skilled in the art will appreciate, voice conversations are predominately void of sound over half of the time and previous revisions of the communication standards have been inefficient from a bandwidth standpoint because over half of the frames exchanged between mobile stations and base stations have effectively communicated background noise in the presence of no voice data. Hence, smart blanking techniques enable a reduced amount of transmissions between the mobile station and base station under those conditions described above.

Accordingly, the diagram 400 of FIG. 4 depicts gated PCGs 403 for null-rate frame transmission when smart-blanking is enabled in a comporting mobile station. That is, during a null-rate frame, the mobile station only transmits its signals every two PCGs, that is, during PCG15 and PCG0, PCG3 and PCG4, PCG7 and PCG8, and PCG11 and PCG12. And via a technique directed by protocol standards, a comporting base station is informed, generally by information transmitted in PCG15, which a following frame is a null-rate frame and thus gating will be performed.

As a result, smart blanking provides for roughly a 50 percent reduction in power transmitted by the mobile station, and as a consequence power control bits are transmitted to the base station during every other odd-numbered PCG, that is PCG3, PCG7, PCG11, and PCG15, which indicated in the diagram 400 by two following asterisks ("**"). Accordingly, when a mobile station transmits a non-null-rate frame, the odd-numbered PCGs 402 carry power control bit information at 400 Hz. When smart-blanking is enabled and the mobile station transmits a null-rate frame, the mobile station transmits power control bits in PCG3, PCG7, PCG11, and PCG15, that is, every other odd-numbered PCG.

From the perspective of the base station, as is shown in the diagram 300 of FIG. 3, the base station transmits power control bits in all odd-numbered PCGs 302. And when the mobile station transmits a non-null-rate frame, all of the power control bits received are considered valid by the base station. However, when smart blanking is enabled and the mobile station transmits a null-rate frame, the mobile station only considers valid the power control bits received in PCG1, PCG5, PCG9, and PCG13, which are indicated in the diagram 300 by two following asterisks ("**").

The above constraints regarding the gating of PCGs and the transmission of power control bit information within PCGs is defined by more recent revisions of the IS-95 CDMA protocol. And the present inventors have observed numerous limitations resulting therefrom. For example, it has been noted that there is essentially a delay of two PCGs from the time power control bits are transmitted in the forward link to the time the resulting transmit power on the reverse link is changed in the presence of smart-blanking. That is, if the base station sends power control bits during PCG 1, because PCG1 and PGG2 are gated, the effect will not be seen in the reverse link until PCG3.

Likewise, because of smart blanking, there is also a delay in affecting forward link power control. For example, when the base station sends power control bits in PCG1, the mobile station measures the received signal strength during PCG1, and then transmits subsequent power control bits to control forward link power in PCG3, and thus forward link power control takes affect in PCG4 transmitted from the base station.

And when smart blanking is not enabled, the present inventors have noted that current technologies provide for a delay of approximately two PCGs for both forward and reverse link power control.

Accordingly, the present inventors have observed that the latencies associated with closed loop power control in a CDMA-base wireless communication system that provides for smart blanking are overwhelmingly a result of the constraints and restrictions according to the protocol standard, and it is thus desirable to provide more flexible techniques whereby these latencies can be reduced, thereby providing for a reduction in interference, and also whereby unnecessary transmissions from the base station can be reduced as well.

Therefore, several embodiments according to the present invention will now be discussed with reference to FIGS. 5-8, which accomplish the above-noted desires. Accordingly, attention is now directed to FIG. 5, where a block diagram is presented depicting a system 500 for adaptive wireless power control according to the present invention. The system 500 includes a base station 501 and a mobile station 511. The base station 501 is coupled to the mobile station 511 by a wireless forward link, upon which traffic and control data are sent by the base station 501 to the mobile station 511, including power control data. The base station 501 is also coupled to the mobile station 511 by a wireless reverse link, upon which traffic and control data are sent by the mobile station 511 to the base station 501, including power control data.

The base station 501 has receiver 506 that is coupled to the reverse link. The receiver has power sensor 502 which generates a strength signal STRENGTH and a received power control bits signal RCVPCB. The receiver 506 also has an adaptive controller 507 that generates a signal BESTPATTERN. Signal STRENGTH is coupled to an adaptive power control bit manager 503, which generates a transmit power control bit signal XMITPCB and a timeline configuration signal TLCONFIG. Signal RCVPCB is coupled to a power control bit processor 504, which produces a transmitting level signal XMITLVL. Signals XMITPCB, TLCONFIG, and XMITLVL are coupled to a transmitter 508, which is coupled to the forward link and which is employed to send traffic and power control messages to the mobile station 511. The transmitter 508 includes a transmit power controller 505 that receives signal XMITPCB and a timeline manager 509 that receives signal TLCONFIG.

The mobile station 511 has a receiver 516 that is coupled to the forward link. The receiver 516 includes a power sensor 512 which generates a strength signal STRENGTH and a received power control bits signal RCVPCB. The receiver 516 also has an adaptive controller that generates a signal BESTPATTERN. Signal STRENGTH is coupled to an adaptive power control bit manager 513, which generates a transmit power control bit signal XMITPCB and a timeline configuration signal TLCONFIG. Signal RCVPCB is coupled to a power control bit processor 514, which produces a transmit level signal XMITLVL. Signals XMITPCB, TLCONFIG, and XMITLVL are coupled to a transmitter 518, which is coupled to the reverse link and which is employed to send traffic and power control messages to the base station 501. The transmitter 518 includes a transmit power controller 515 that receives signal XMITPCB and a timeline manager 519 that receives signal TLCONFIG.

There are two key factors in choosing power control timeline. One is the PCB transmission delay between RL and FL, the other is the pilot channel gating pattern. Shown in FIGS. 9, 10, 11 and 12, two approaches for minimizing power control delay when the power rate is slow down. It could be understood that one approach is to change smart blanking pattern while keep both RL PCBs and FL PCBs in the even (odd) number PCGs, another is to keep FL PCBs in even(odd) number PCGs and RL PCBs in odd (even) number PCGs.

Figure 5:
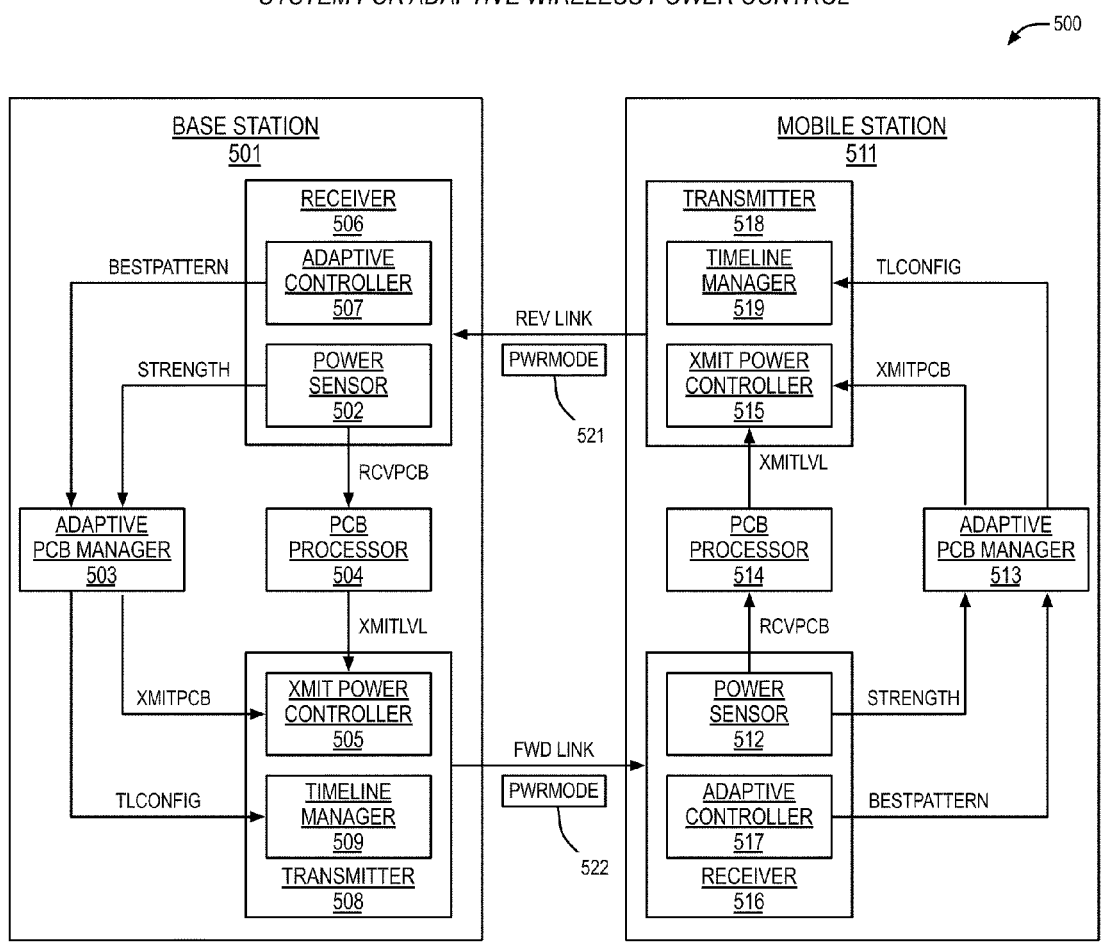
FIG. 5 is a block diagram depicting a system for adaptive wireless power control according to the present invention.

In operation, closed loop power control is affected through the timely exchange of power control messages between the base station 501 and the mobile station 511 as in the system 500 of FIG. 5. Like-named elements within both the base station 501 and mobile station 511 perform substantially similar functions to achieve substantially similar results from the perspective of closed loop power control. That is, the power sensors 502, 512 monitor respective reverse and forward link messages to receive power control bits within frames received and also to measure the relative power level of the received signals on the links. The base station power sensor 502 generates STRENGTH to indicate the measured power level of the reverse link signal and also generates RCVPCB to indicate power control bit data that has been received from the mobile station 511. The power control bit data directs that the level of the forward link signal be either increased or decreased according to the protocol. Likewise, the mobile station power sensor 512 generates STRENGTH to indicate the measured power level of the forward link signal and also generates RCVPCB to indicate power control bit data that has been received from the base station 501. The power control bit data directs that the level of the reverse link signal be either increased or decreased according to the protocol.

The PCB processors 504, 514 receive and interpret the RCVPCB signals and generate XMITLVL signals that direct their respective transmit power controllers 505, 515 to increase or decrease transmit power in accordance with the power control bit data which was received.

The adaptive PCB managers 503, 513 receive their respective STRENGTH signals and determine whether to request a change in power level transmitted by the counterpart station 511, 501. Accordingly, the adaptive PCB managers 503, 513 configure power control bit data for transmission within a frame to the counterpart station 511, 501 that directs that counterpart station 511, 501 to increase or decrease transmitted power.

The transmit power controllers 505, 515, transmit their respective power control bit data, as directed by signals XMITPCB over the forward and reverse links at the power levels indicated by signals XMITLVL, thus achieving what is knows by those in the art as closed loop power control.

In contrast to the present day system 200 shown in FIG. 2, however, the system 500 according to the present invention provides for adaptive control of a timeline for exchange of power control information. In one embodiment, the base station 501 broadcasts a power mode message 522 over the forward link to the mobile station 511 indicating a particular power control timeline which is to be employed for the exchange of power control information between the base station 501 and the mobile station 511. In another embodiment, the base station 501 and the mobile station exchange power mode messages 522, 521 to inquire as to the capabilities of each device 501, 511 to perform adaptive power control and to negotiate for use of a particular power control timeline according to the present invention. Accordingly, the adaptive controller 517 within the mobile receiver 516 monitors the forward link for power mode broadcasts 522 or messages 522, and, based upon configuration of the mobile station, indicates a desirable (or directed, in the case of a broadcast) power control timeline on signal BESTPATTERN, where the desirable (or directed) power control timeline minimizes latencies and transmission power associated with performing closed loop power control within the system 500.

The adaptive PCB manager 513 receives BESTPATTERN, and in conjunction with the power level indicated by signal STRENGTH, determines a timeline configuration, as directed by the base station, or as a result of configuration. The timeline configuration is passed to a timeline manager 519 within the transmitter 518 via signal TLCONFIG.

In a broadcast embodiment, the mobile station 511 does not transmit a power mode message 521 over the reverse link, but adheres to the timeline configuration which was broadcast by the base station in the power mode message 522 over the forward link. In a negotiated timeline embodiment, the timeline manager 519 generates a recommended timeline configuration for transmission in the power mode message 521 over the reverse link to the base station 501. The present invention contemplates any of several well known methods for performing a timeline negotiation including incrementing requests from each of the devices 501, 511 followed by acknowledgements, request-acknowledgement, a limited number of tries by each device, and etc. What is significant is that provisions are made within both a base station 501 and a mobile station 511 according to the present invention to select an optimum power control timeline from among a plurality of power control timelines, where the optimum power control timeline is chosen to minimize delay within a closed loop power control system 500 or to optimize some other feature of the system 500.

As described above, the timeline design is a key factor to optimize the power control and reduce the unwanted delay, and it is determined by the PCG transmission delay between RL and FL, and the R-PICH (Reverse-pilot channel) gating pattern which indicate the frame blanking pattern.

In addition, the adaptive controller 507 within the base receiver 506 monitors the reverse link for power mode messages 521 in a negotiated timeline embodiment and, based upon configuration of the base station, indicates a desirable power control timeline on signal BESTPATTERN, where the desirable power control timeline minimizes latencies and transmission power associated with performing closed loop power control within the system 500. When the transmission is terminated, R/F-PICH is gating, no traffic data in the link, or other interrupted happed and make the data rate slow down on FL or RL channel. The BESTPATTERN indicates the suitable transmitting pattern, such as the smart blanking.

The adaptive PCB manager 503 receives BESTPATTERN, and in conjunction with the power level indicated by signal STRENGTH, determines a timeline configuration as a result of configuration of the system 500. The timeline configuration is passed to a timeline manager 509 within the transmitter 508 via signal TLCONFIG.

In a broadcast embodiment, the base station 501 transmits a power mode message 522 over the forward link, directing the mobile station 511 to employ a particular timeline configuration. In a negotiated timeline embodiment, the timeline manager 509 generates a recommended timeline configuration for transmission in the power mode message 522 over the forward link to the mobile station 511, and the timeline which is ultimately selected is negotiated as is described above.

Figure 6:
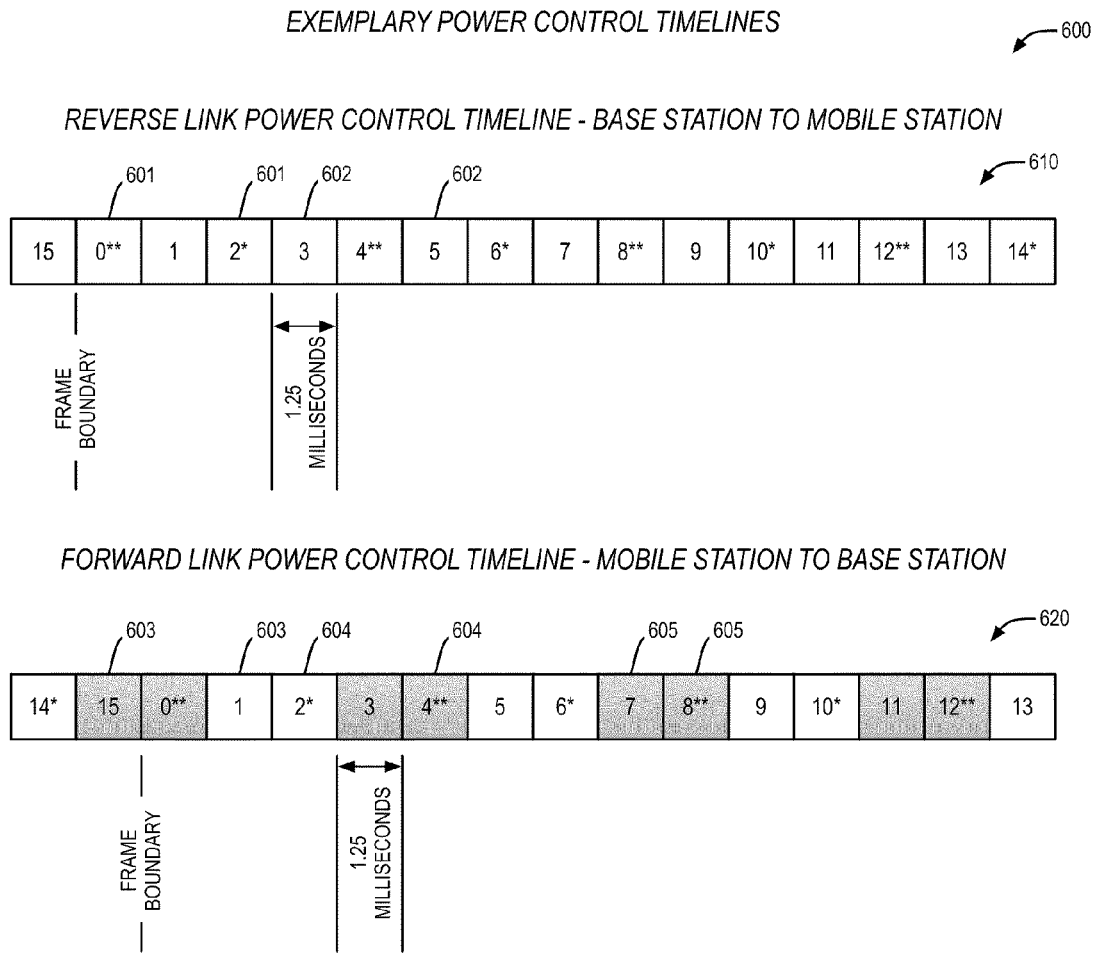
FIG. 6 is a block diagram detailing an exemplary power control timeline according to the present invention showing both forward link frames and reverse link frames.

Turning now to FIG. 6 is, a block diagram is presented detailing an exemplary power control timeline 600 according to the present invention showing both forward link frames 610 and reverse link frames 620. Like the standardized power control timeline of IS-95 as discussed with reference to FIGS. 3 and 4, the exemplary power control timeline 600 according to the present invention comprises frames 610, 611 which are each comprised of 16 1.25 ms PCGs 601, 602, 603, 604, 605, which are numbered 0 though 15 within respective frames 610, 620. In contrast to the standardized timeline, however, the exemplary timeline 600 depicts the same gating pattern (i.e., reverse link transmissions during PCG15, PCG0, PCG3, PCG4, PCG7, PCG8, PCG11, and PCG12) as the standardized timeline of FIGS. 3 and 4, but a different protocol for transmission and reception of power control bits. Accordingly, the forward link frames 610 transmit power control bits to the mobile station during even-numbered PCGs 601 as indicated by one or two following asterisks. Likewise, for non-null-rate transmission, the reverse link frames 620 transmit power control bits to the base station during even-numbered PCGs, 604 as indicated by one or two following asterisks. And for null-rate transmissions when smart blanking is enabled, the reverse link frames 620 transmit power control bits during every other even-numbered PCG, to with, PCG0, PCG4, PCG8, and PCG12, as indicated by two following asterisks.

From the perspective of the base station, power control bits are transmitted in all even-numbered PCGs 601. And when the mobile station transmits a non-null-rate frame, all of the power control bits received are considered valid by the base station. However, when smart blanking is enabled and the mobile station transmits a null-rate frame, the mobile station only considers valid the power control bits received in PCG0, PCG4, PCG8, and PCG12, which are indicated in the diagram 600 by two following asterisks ("**").

The exemplary timeline 600 according to the present invention may be employed to overcome some of the power control latencies due to smart blanking. For example, if the base station sends power control bits during PCG 2, even though PCG1 and PGG2 are gated by the mobile station, the effect will be seen in the reverse link at PCG3, which is a substantial reduction in latency. And more efficient power control results in an overall reduction in interference.

The power control timeline 600 of FIG. 6 is presented solely to teach one available timeline variant according to the present invention, which may be either directed by the base station or which may be negotiated by exchange of power mode messages between and base station and a mobile station according to the present invention. Other timeline configurations are contemplated as well to include changing the smart-blanking power control bit transmission pattern while keeping both reverse link and forward link PCGs for transmission of power control information fixed within even-numbered PCGs, changing the smart-blanking power control bit transmission pattern while keeping reverse link PCGs for transmission of power control information in odd-numbered PCGS and keeping forward link PCGs for transmission of power control information fixed within even-numbered PCGs, and etc. It is a feature of the present invention to provide for an optimum selection of a power control timeline through either broadcast by a base station, or by negotiation between a base station and a mobile station according to the present invention.

Figure 7:
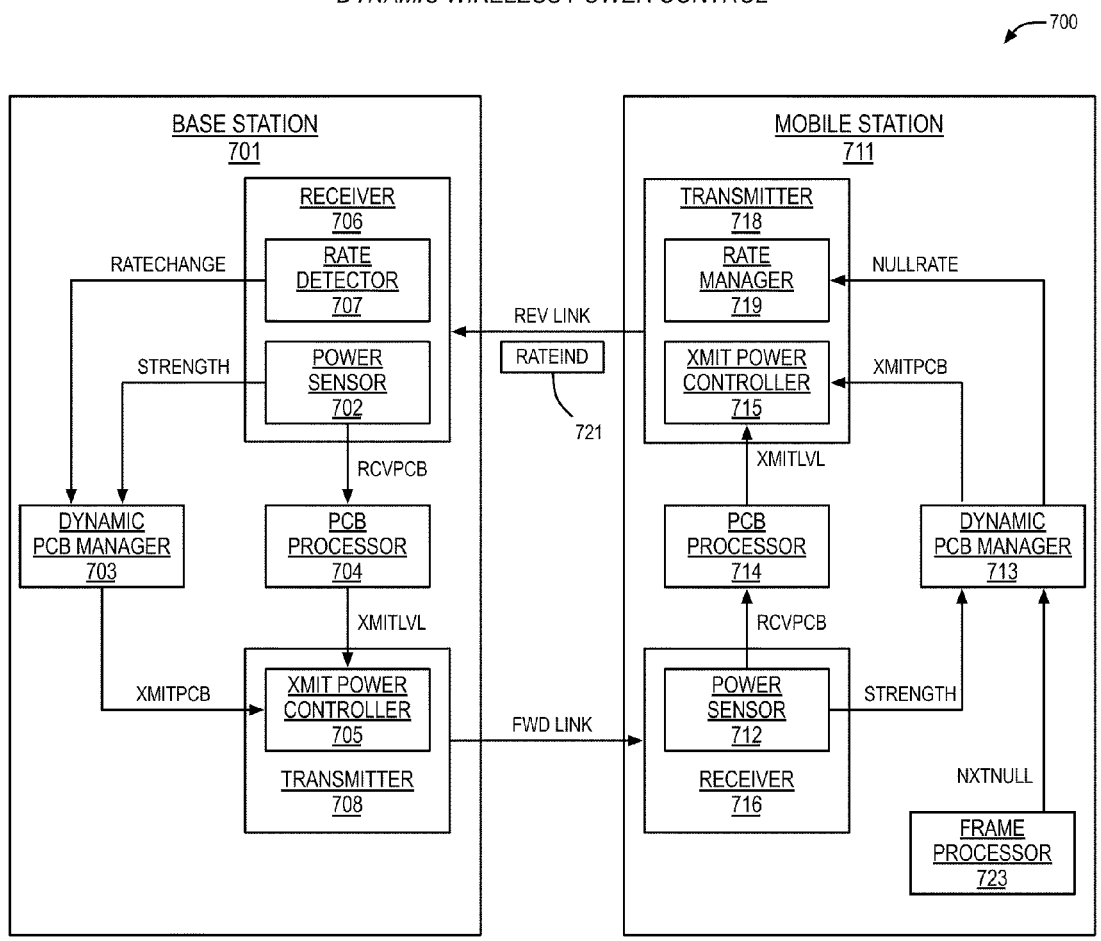
FIG. 7 is a block diagram highlighting a system for dynamic wireless power control according to another embodiment of the present invention.

Referring now to FIG. 7, a block diagram is presented highlighting a system 700 for dynamic wireless power control according to another embodiment of the present invention. In this embodiment, the frequency of transmission of power control bits by a base station 701 over the forward link is reduced from 400 Hz to 200 Hz when it is determined that a null-rate frame is being transmitted over the reverse link by a 711 mobile station in which smart blanking is enabled, and the frequency of transmission is increased from 200 Hz to 400 Hz when it is determined that a non-null-rate frame is being transmitted by the mobile station 711 subsequent to transmission of a null-rate frame.

The system 700 includes the base station 701 and the mobile station 711. The base station 701 is coupled to the mobile station 711 by a wireless forward link, upon which traffic and control data are sent by the base station 701 to the mobile station 711, including power control data. The base station 701 is also coupled to the mobile station 711 by a wireless reverse link, upon which traffic and control data are sent by the mobile station 711 to the base station 701, including power control data.

The base station 701 has receiver 706 that is coupled to the reverse link. The receiver has power sensor 702 which generates a strength signal STRENGTH and a received power control bits signal RCVPCB. The receiver 706 also has rate detector 707 that generates a signal RATECHANGE. Signal STRENGTH is coupled to a dynamic power control bit manager 703, which generates a transmit power control bit signal XMITPCB. Signal RCVPCB is coupled to a power control bit processor 704, which produces a transmit level signal XMITLVL. Signals XMITPCB, and XMITLVL are coupled to a transmitter 708, which is coupled to the forward link and which is employed to send traffic and power control messages to the mobile station 711. The transmitter 708 includes a transmit power controller 705 that receives signal XMITPCB.

The mobile station 711 has a receiver 716 that is coupled to the forward link. The receiver 716 includes a power sensor 712 which generates a strength signal STRENGTH and a received power control bits signal RCVPCB. Signal STRENGTH is coupled to a dynamic power control bit manager 713, which generates a transmit power control bit signal XMITPCB and a null-rate signal NULLRATE. A frame processor 723 is coupled to the dynamic power control bit manager 713 via signal NXTNULL. Signal RCVPCB is coupled to a power control bit processor 714, which produces a transmit level signal XMITLVL. Signals XMITPCB, NULL-RATE, and XMITLVL are coupled to a transmitter 718, which is coupled to the reverse link and which is employed to send traffic and rate indication messages 721 to the base station 701. The transmitter 718 includes a transmit power controller 715 that receives signal XMITPCB and a rate manager 719 that receives signal NULLRATE.

In operation, closed loop power control is affected through the timely exchange of power control messages between the base station 701 and the mobile station 711 as in the system 200 of FIG. 2. Like-named elements within both the base station 701 and mobile station 711 perform substantially similar functions to achieve substantially similar results from the perspective of closed loop power control. That is, the power sensors 702, 712 monitor respective reverse and forward link messages to receive power control bits within frames received and also to measure the relative power level of the received signals on the links. The base station power sensor 702 generates STRENGTH to indicate the measured power level of the reverse link signal and also generates RCVPCB to indicate power control bit data that has been received from the mobile station 711. The power control bit data directs that the level of the forward link signal be either increased or decreased according to the protocol. Likewise, the mobile station power sensor 712 generates STRENGTH to indicate the measured power level of the forward link signal and also generates RCVPCB to indicate power control bit data that has been received from the base station 701. The power control bit data directs that the level of the reverse link signal be either increased or decreased according to the protocol.

The PCB processors 704, 714 receive and interpret the RCVPCB signals and generate XMITLVL signals that direct their respective transmit power controllers 705, 715 to increase or decrease transmit power in accordance with the power control bit data which was received.

The dynamic PCB managers 703, 713 receive their respective STRENGTH signals and determine whether to request a change in power level transmitted by the counterpart station 711, 701. Accordingly, the dynamic PCB managers 703, 713 configure power control bit data for transmission within a frame to the counterpart station 711, 701 that directs that counterpart station 711, 701 to increase or decrease transmitted power.

The transmit power controllers 705, 715, transmit their respective power control bit data, as directed by signals XMITPCB over the forward and reverse links at the power levels indicated by signals XMITLVL, thus achieving closed loop power control.

In contrast to a present day system 200, however, the system 700 according to the present invention provides for dynamic control of the frequency by which power control bits are transmitted over the forward link when the mobile station has smart blanking enabled. Recall in the example of FIGS. 2-4, although the base station 201 transmits power control bits at a 400 Hz rate in PCGs 1, 3, 5, 7, 9, 11, 13, and 15 according to standards, when smart blanking is enabled and the mobile station 211 is transmitting a null-rate frame, only the power control bits within PCGs 1, 5, 9, and 13 are considered valid. Consequently, the present inventors have observed that the overhead associated with processing power control bit information by the base station is wasted when the mobile station is transmitting a null-rate frame because the power control bits in every other odd-numbered PCG received by over the forward link are ignored.

Consequently, the base station 701 detects transmission of a null-rate frame over the reverse link by known methods, that is, through monitoring of the reverse link pilot pattern. In contrast to present data systems, however, the system 700 according to the present invention reduces the rate of transmission of power control bits over the forward link from 400 Hz to 200 Hz. In the example of FIG. 3, this would mean elimination of power control bits (and related overhead) for transmission in PCGs 3, 7, 11, and 15. When the mobile station 711 returns to transmission of non-null-rate frames, then the rate of transmission of power control bits over the forward link is increased back to 400 Hz.

In one embodiment, the frame processor 723 indicates via NXTNULL if the next frame to be transmitted is a null-rate frame or a non-null-rate frame. Thus, the PCB manager 713 indicates via NULLRATE this information to the rater manager 719, which transmits a rate indication message 721 to the base station over the reverse link during one of the latter PCGs of the previous frame. The rate detector 707 detects this rate change and indicates via signal RATECHANGE that the next frame is either a non-null-rate frame or a null-rate frame. Accordingly, the dynamic power control bit manager 703 directs the transmit power controller 705 via signal XMIT-PCB whether or not to transmit power control bit information at 400 Hz or 200 Hz.

Figure 8:
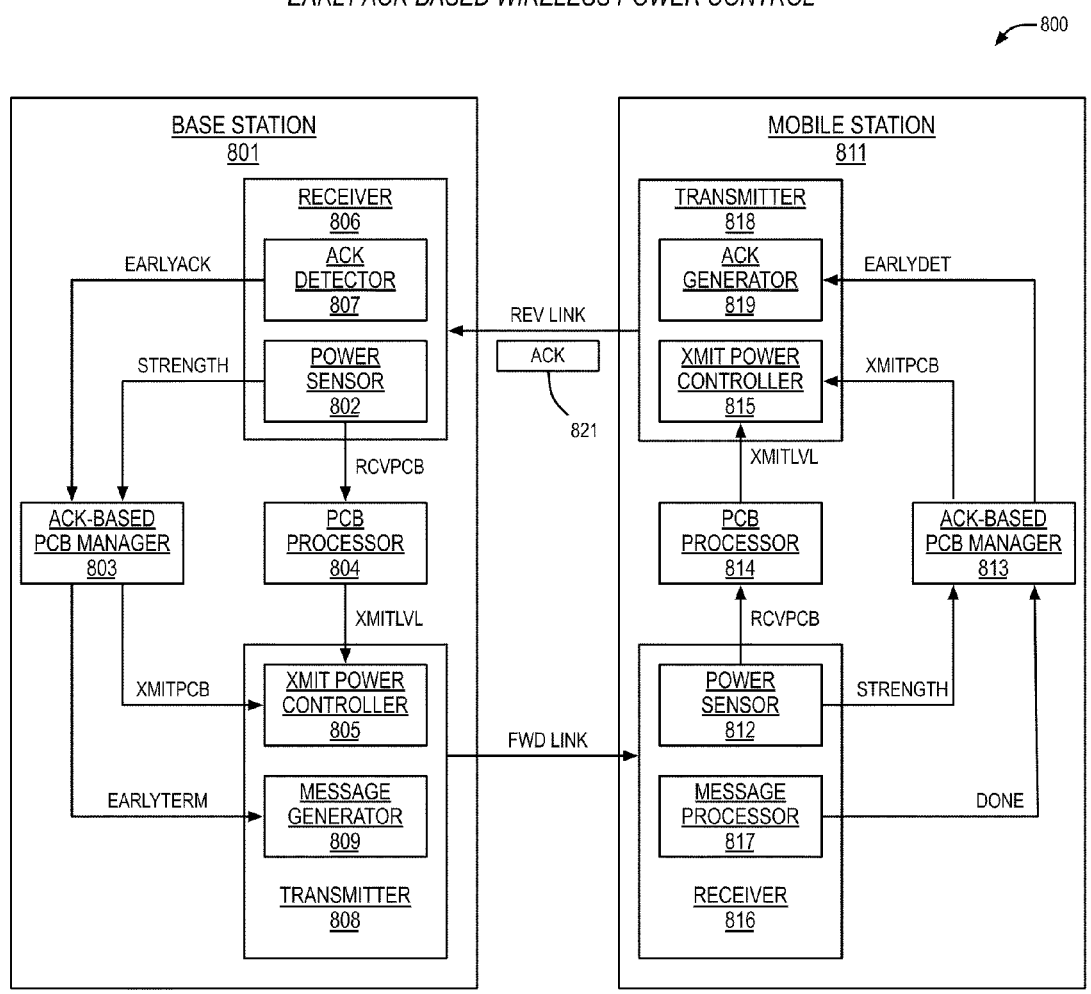
FIG. 8 is a block diagram featuring an early ack-based wireless power control system according to a further embodiment of the present invention.
Figure 9:
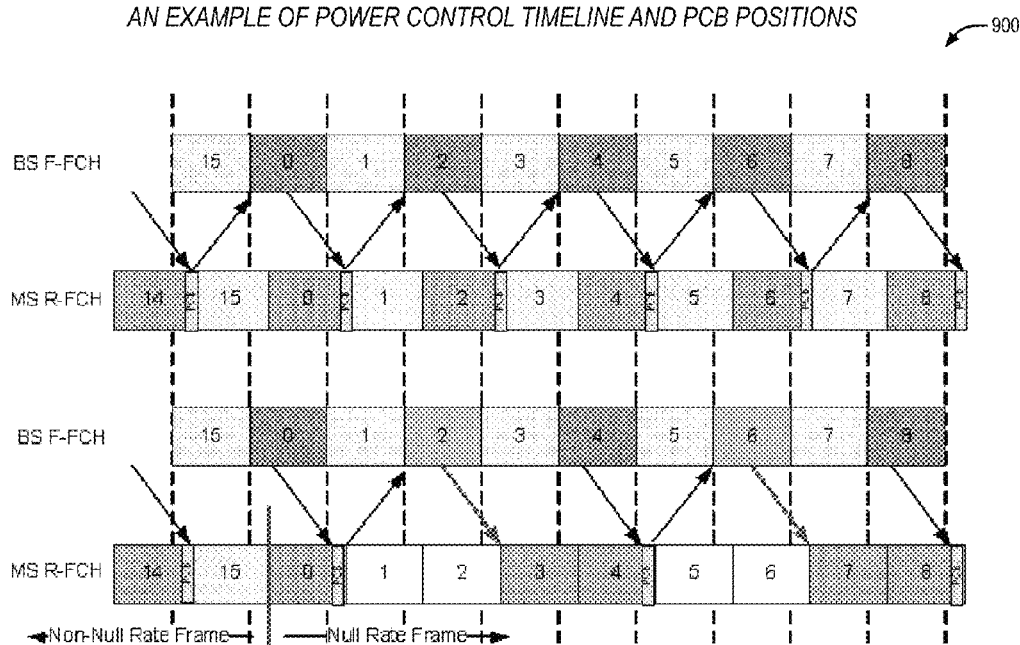
FIG. 9 is a block diagram showing the power control timeline and PCB positions according to the present invention.
Figure 10:
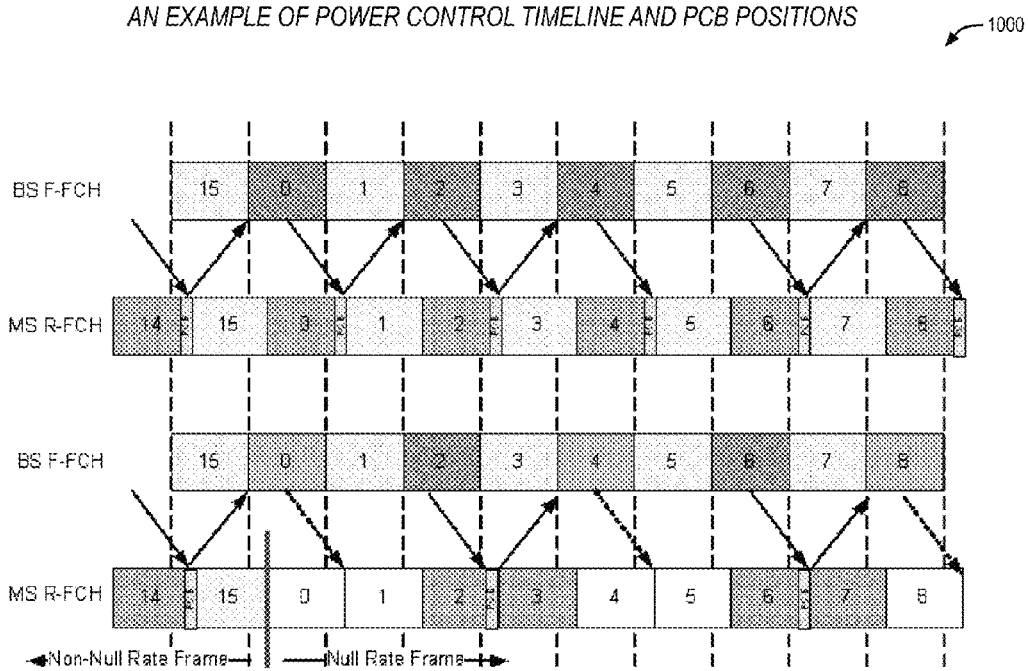
FIG. 10 is a block diagram showing the power control timeline and PCB positions according to the present invention.
Figure 11:
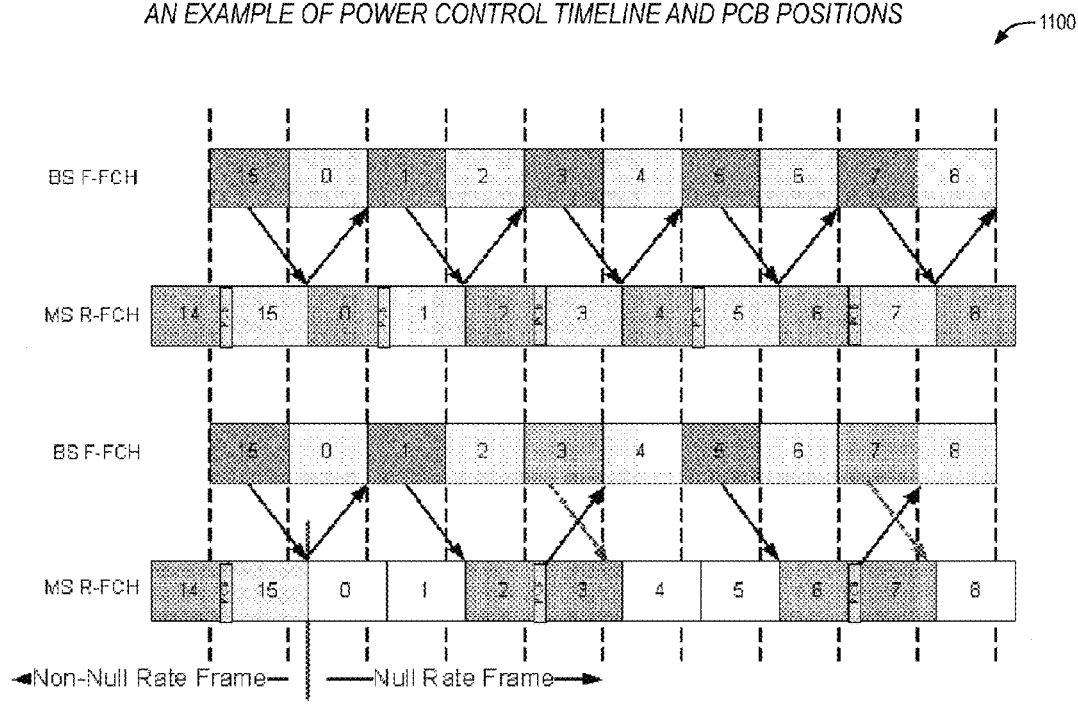
FIG. 11 is a block diagram showing the power control timeline and PCB positions according to the present invention.
Figure 12:
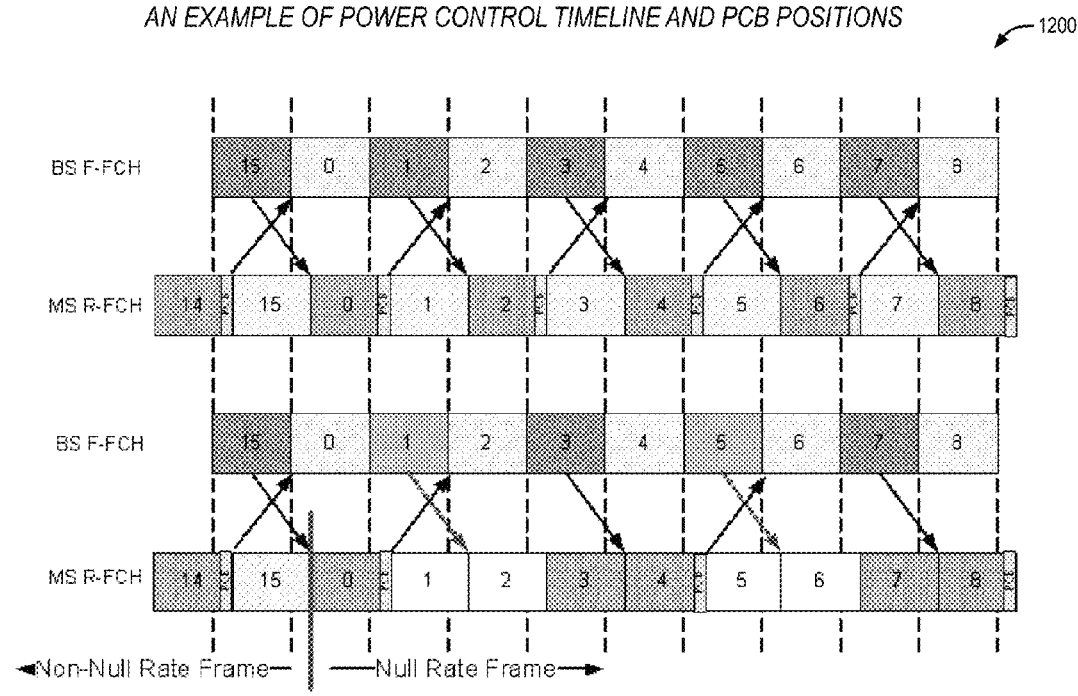
FIG. 12 is a block diagram showing the power control timeline and PCB positions according to the present invention.

Now turning to FIG. 8, a block diagram featuring an early ack-based wireless power control system according to a further embodiment of the present invention. The application of this embodiment may be used in combination with the embodiments of FIGS. 5-7 and is employed to reduce the transmission of power control bit information from 400 Hz to 200 Hz over both the forward and reverse links when an early termination occurs in the forward link. It is well known that a significant number of frames within a present day cellular system contain traffic which can be decoded and acknowledged by a mobile station 811 prior to completion of the transmission of the entire frame by a base station 801. Within the art, this is known as "early termination." For example, over half of the frames contain what is known as ⅛ rate voice, and which can be decoded within the first few PCGs of a frame. Accordingly, the present embodiment is provided to allow for the transmission of power control bit information to be adjusted in accordance with early termination in order to decrease interference and to increase processing capacity.

The system 800 includes the base station 801 and the mobile station 811. The base station 801 is coupled to the mobile station 811 by a wireless forward link, upon which traffic and control data are sent by the base station 801 to the mobile station 811, including power control data. The base station 801 is also coupled to the mobile station 811 by a wireless reverse link, upon which traffic and control data are sent by the mobile station 811 to the base station 801, including power control data.

The base station 801 has receiver 806 that is coupled to the reverse link. The receiver has power sensor 802 which generates a strength signal STRENGTH and a received power control bits signal RCVPCB. The receiver 806 also has an acknowledge message detector 807 that generates a signal EARLYACK. Signal STRENGTH is coupled to an acknowledge-based power control bit manager 803, which generates a transmit power control bit signal XMITPCB and a signal EARLYTERM. Signal RCVPCB is coupled to a power control bit processor 804, which produces a transmit level signal XMITLVL. Signals XMITPCB, EARLYTERM, and XMITLVL are coupled to a transmitter 808, which is coupled to the forward link and which is employed to send traffic and power control messages to the mobile station 811. The transmitter 808 includes a transmit power controller 805 that receives signal XMITPCB and a message generator 809, which is configured to terminate transmission of traffic over the forward link when an early acknowledgement message 821 has been received from the mobile station 811.

When there is smart-blanking and null-rate transmission, the acknowledge transmission can be optional not transmitted.

The mobile station 811 has a receiver 816 that is coupled to the forward link. The receiver 816 includes a power sensor 812 which generates a strength signal STRENGTH and a received power control bits signal RCVPCB. The receiver 816 also has a message processor 817 that generates a signal DONE. Signal STRENGTH is coupled to an acknowledge-based power control bit manager 813, which generates a transmit power control bit signal XMITPCB and an early message detection signal EARLYDET. Signal RCVPCB is coupled to a power control bit processor 814, which produces a transmit level signal XMITLVL. Signals XMITPCB, EARLYDET, and XMITLVL are coupled to a transmitter 818, which is coupled to the reverse link and which is employed to send traffic and early acknowledgement messages 821 to the base station 801. The transmitter 818 includes a transmit power controller 815 that receives signal XMITPCB and an acknowledge message manager 819 that receives signal EARLYDET.

In operation, closed loop power control is affected through the timely exchange of power control messages between the base station 801 and the mobile station 811 as in the system 200 of FIG. 2. Like-named elements within both the base station 801 and mobile station 811 perform substantially similar functions to achieve substantially similar results from the perspective of closed loop power control. That is, the power sensors 802, 812 monitor respective reverse and forward link messages to receive power control bits within frames received and also to measure the relative power level of the received signals on the links. The base station power sensor 802 generates STRENGTH to indicate the measured power level of the reverse link signal and also generates RCVPCB to indicate power control bit data that has been received from the mobile station 811. The power control bit data directs that the level of the forward link signal be either increased or decreased according to the protocol. Likewise, the mobile station power sensor 812 generates STRENGTH to indicate the measured power level of the forward link signal and also generates RCVPCB to indicate power control bit data that has been received from the base station 801. The power control bit data directs that the level of the reverse link signal be either increased or decreased according to the protocol.

The PCB processors 804, 814 receive and interpret the RCVPCB signals and generate XMITLVL signals that direct their respective transmit power controllers 805, 815 to increase or decrease transmit power in accordance with the power control bit data which was received.

The ack-based PCB managers 803, 813 receive their respective STRENGTH signals and determine whether to request a change in power level transmitted by the counterpart station 811, 801. Accordingly, the dynamic PCB managers 803, 813 configure power control bit data for transmission within a frame to the counterpart station 811, 801 that directs that counterpart station 811, 801 to increase or decrease transmitted power.

The transmit power controllers 805, 815, transmit their respective power control bit data, as directed by signals XMITPCB over the forward and reverse links at the power levels indicated by signals XMITLVL, thus achieving closed loop power control.

In contrast to a present day system 200, however, the system 800 according to the present invention provides for dynamic control of the frequency by which power control bits are transmitted over the forward link when there is no forward link traffic to transmit as a result of early termination. Accordingly, the message processor 817 decodes traffic within the frame as the PCGs are received. In the case where traffic has been fully decoded in a PCG prior to PCG15, the message processor 817 asserts DONE, thus directed the PCB manager 813 to generate EARLYDET. The ack generator 819 receives EARLY detect and modulates an early acknowledgement message for transmission to the base station 801 over the reverse link by any of several techniques to include merging the early acknowledgement message with transmission of power control bits through the use of on-off keying (OOK) plus binary phase shift keying (BPSK) to produce a three-status ack symbol, although other embodiments are contemplated.

Consequently, the ack detector 807 within the base station 801 detects transmission of the early acknowledgement message 821 and asserts EARLYACK to direct the ack-based PCB manager 803 to assert EARLYTERM and to additionally reduce the transmission rate of power control bits from 400 Hz to 200 Hz by setting the state of XMITPCB. The message generator 809 receives EARLYTERM and ceases transmitting traffic for the remainder of the frame.

The above description focuses on the merging acknowledge and power control subchannel. Shortly, If the base station successfully receives or detects a Forward Fundamental Channel 0 bps frame, it shall not send an acknowledgement on the Reverse Acknowledgment Channel. The ACK or NAK for the Forward Fundamental Channel frame shall be only in power control groups where the Acknowledgment mask for the respective channel is equal to '1'. Like the same, If the mobile station successfully receives a 0 bps frame on the Forward Fundamental Channel, it shall not transmit an acknowledgment on the Reverse Acknowledgment Channel 1.

In the implementation, after the signal symbol is spread, it will go through a predefined chip level interleaver. The length of the interleaver can be one symbol, two symbols or 1.5 symbols, etc. The predefined chip level interleaver can be one for each user or one shared by multiple users. At the receiver side, there will be a deinterleaver which is followed by a despreader. With reference of power control overhead reduction, when RL smart blanking is enabled no transmission on invalid PCB in FL, when RL smart blanking is disable, power control down after the termination, and FL smart blanking is on, the power control down to 0 bps frame.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. A communication device wirelessly coupled to another communication device, comprising:

a receiver, configured to receive a plurality of sub-frames and to generate a strength signal and a pattern signal, wherein the strength signal indicates a measured power level of a received link signal, and wherein the value of the pattern signal is based upon a power mode message that is received from the another communication device, and wherein the power mode message indicates that placement and validation of power control bits is to be changed according to a desirable power control timeline;

a power control bit (PCB) processor configured to receive a plurality of first power control bits which is selected from the plurality of received sub-frames and generate a power level indicating signal;

a power control bit (PCB) manager, configure to receive the strength signal and the pattern signal, and to determine the validation and place of a plurality of second power control bits according to the strength signal and the pattern signal; and a transmitter, configured to transmit the plurality of second power control bits to the another communication device according to the power level indication signal.

2. The communication device as recited as claim 1, wherein when one of the plurality of first power control bits indicates a predetermined value, the following particular amount of sub-frames is determined as null rate frame and part of the plurality of second power control bits are blanked, when said one of the first power control bits indicates other values, the following same amount of sub-frames are determined as non-null rate frame.

3. The communication device as recited as claim 2, wherein the interval of each second power control bits when determined as null rate frame is multiple times than the interval of second power control bits when determined as non-null rate frame.

4. The communication device as recited as claim 2, wherein the PCB manager generates an acknowledge signal when received a non-null rate frame, the acknowledge signal is modulated by BPSK which comprising a positive acknowledge phase and a negative acknowledge phase.

5. The communication device as recited as claim 2, wherein when there is early termination or no traffic transmission to the communication device before one of the plurality of first power control bits indicates a predetermined value, parts of the plurality of second power control bits are blanked as invalid.

6. The communication device as recited as claim 1, wherein the pattern signal indicates whether part of the plurality of second power control bits are blanked, and the PCB manager determines validation and place of a plurality of second power control bits and a timeline design, the timeline design is selected from the following design:

the place of second power control bits is same with the place of the first power control bits; and the place of second power control bits is contrary with the place of the first power control bits.

7. The communication device as recited as claim 1, wherein the communication device is a mobile station or a base station.

8. A method for a communication device which is wirelessly coupled to another communication device, the method comprising:

receiving a plurality of sub-frames, wherein the plurality of sub-frames further comprising a plurality of first power control bits;

generating a strength signal, a pattern signal, and a power level indicating signal, wherein the strength signal indicates a measured power level of a received link signal, and wherein the value of the pattern signal is based upon a power mode message that is received from the another communication device, and wherein the power mode message indicates that placement and validation of power control bits is to be changed according to a desirable power control timeline;

determining the validation and place of a plurality of second power control bits according to the strength signal and the pattern signal; and transmitting the plurality of second power control bits to the another communication device according to the power level indication signal.

9. The method as recited as claim 8, wherein when one of the plurality of first power control bits indicates a predetermined value, the following particular amount of sub-frames is determined as null rate frame and part of the plurality of second power control bits are blanked, when said one of the first power control bits indicates other values, the following same amount of sub-frames are determined as non-null rate frame.

10. The method as recited as claim 9, wherein the interval of each second power control bits when determined as null rate frame is multiple times than the interval of second power control bits when determined as non-null rate frame.

11. The method as recited as claim 9, further comprising:

generating an acknowledge signal when received a non-null rate frame, the acknowledge signal is modulated by BPSK which comprising a positive acknowledge phase and a negative acknowledge phase.

12. The method as recited as claim 9, wherein when there is early termination or no traffic transmission to the communication device before one of the plurality of first power control bits indicates a predetermined value, parts of the plurality of second power control bits are blanked as invalid.

13. The method as recited as claim 8, wherein the pattern signal indicates whether part of the plurality of second power control bits are blanked, and determining validation and place of a plurality of second power control bits and a timeline design is selected from the following design:

the place of second power control bits is same with the place of the first power control bits; and the place of second power control bits is contrary with the place of the first power control bits.

14. The method as recited as claim 8, wherein the communication device is a mobile station or a base station.

15. A system, comprising:

a first communication device wirelessly coupled to a second communication device, the first communication device further comprising:

a first receiver, configured to receive a plurality of first sub-frames, generate a first strength signal and a first pattern signal, wherein the first strength signal indicates a measured power level of a first received link signal, and wherein the value of the first pattern signal is based upon a first power mode message that is received from the second communication device, and wherein the power message indicates that placement and validation of power control bits is to be changed according to a first desirable power control timeline;

a first power control bit (PCB) processor configured to receive a plurality of first power control bits which is selected from the plurality of received first sub-frames and generate a first power level indicating signal;

a first power control bit (PCB) manager, configure to receive the fist strength signal and the first pattern signal, and to determine the validation and place of a plurality of second power control bits according to the first strength signal and the first pattern signal; and a first transmitter, configured to transmit the plurality of second power control bits by a plurality of second sub-frames according to the first power level indication signal; and a second communication device, further comprising:

a second receiver, configured to receive the plurality of second sub-frames, generate a second pattern signal;

a second PCB processor configured to receive the plurality of second power control bits which is selected from the plurality of received second sub-frames and generate a second strength signal and a second power level indicating signal;

a second PCB manager, configure to receive the second strength signal second pattern signal and determine the validation and place of the plurality of first power control bits according to the second strength signal and the second pattern signal; and a second transmitter, configured to transmit the plurality of first power control bits to the mobile apparatus by the plurality of first sub-frames according to the second power level indication signal.

* * * * *